April 6, 1965     R. A. MARCOTTE     3,176,550
WIRE STRIPPING MACHINE

Filed Sept. 12, 1963     3 Sheets-Sheet 1

INVENTOR.
ROBERT A. MARCOTTE
BY Robert T. Casey
ATTORNEY

April 6, 1965

R. A. MARCOTTE 3,176,550

WIRE STRIPPING MACHINE

Filed Sept. 12, 1963

INVENTOR.
ROBERT A. MARCOTTE
BY *Robert T. Casey*

ATTORNEY

April 6, 1965  R. A. MARCOTTE  3,176,550
WIRE STRIPPING MACHINE
Filed Sept. 12, 1963  3 Sheets-Sheet 3

INVENTOR.
ROBERT A. MARCOTTE
BY Robert T. Casey
ATTORNEY

United States Patent Office 3,176,550
Patented Apr. 6, 1965

3,176,550
WIRE STRIPPING MACHINE
Robert A. Marcotte, Bristol, Conn., assignor to General Electric Company, a corporation of New York
Filed Sept. 12, 1963, Ser. No. 308,460
9 Claims. (Cl. 81—9.51)

My invention relates to wire stripping machines, and particularly to machines for removing the insulation covering from the end portions of relatively heavy electrical conductors or cables.

In many electrical applications, it is necessary to utilize relatively heavy electrical conductors or cables, such, for example, as copper cables having a diameter of one-half inch or more and covered with a relatively thick sheath such as 1/16 of an inch or more of electrical insulating material. In order to make connections to the ends of such cables, it is necessary to remove the insulating sheath for a distance of an inch or more. In order not to weaken the conductor at any point, it is essential that the metallic conductor should not be notched or nicked during the process of cutting the insulation, and also that it should not be scraped or scratched as the insulation is removed. Automatic wire stripping machines and devices heretofore available have not been able to remove insulation from conductors of this size without some such damage to the conductor itself. The insulation-removal problem is intensified by the fact that conductors of such size are ordinarily composed of a number of individual strand conductors which are twisted to a spiral form, making it difficult to slide a section of insulation therealong, after severing it from the remaining insulation.

It is an object of my invention to provide a machine which is capable of removing insulation from the end portions of conductors of substantial size, such as 1/2" diameter or more without damage to the conductor itself.

It is another object of my invention to provide a machine which can perform the insulation removing operation on cables of substantial size at high speed.

It is another object of the invention to provide an insulation removing or wire stripping machine which can be readily adapted to conductors of varying sizes.

It is a further object of the invention to provide such a machine which is rugged and dependable.

In accordance with the invention in one form, a wire stripping machine is provided including a pair of insulation cutting jaws pivotally supported on a fixed pivot. A pair of insulation removing or stripping jaws is also provided, the insulation stripping jaws being hinged together and supported for sliding movement within the insulation cutting jaws. A first linearly-acting actuating means is provided for operating the insulation cutting jaws, and a second linearly-acting actuating means is provided for operating and insulation removing or stripping jaws. Because of the fact that the insulation stripping jaws are slidably supported within the pivoted insulation cutting jaws, the insulation removing motion of the stripping jaws cannot take place until the insulation cutting jaws are completely closed, in which condition they are parallel to each other. This assures that the insulation has been cut as required before the stripping action begins.

In accordance with another aspect of the invention, the linearly-acting actuating means for the insulation cutting jaws and the linearly-acting actuating means for the stripping jaws are both provided by a single linear-acting device which in one form comprises an air cylinder having a moving plunger therein. The plunger is connected to and operates the insulation cutting jaws, while the housing or cylinder itself is connected to the wire stripping jaws. The entire air cylinder is slidably mounted, whereby initial motion of the plunger serves to move the insulation cutting jaws to closed position, and thereafter motion of the body of the cylinder in the opposite direction serves to operate the wire stripping jaws. The fact that the wire stripping jaws are mounted within the insulation cutting jaws assures the necessary sequence of the motions and assures that the insulation will have been cut to the desired depth before the wire stripping jaws act on the insulation to remove it.

Figure 1:
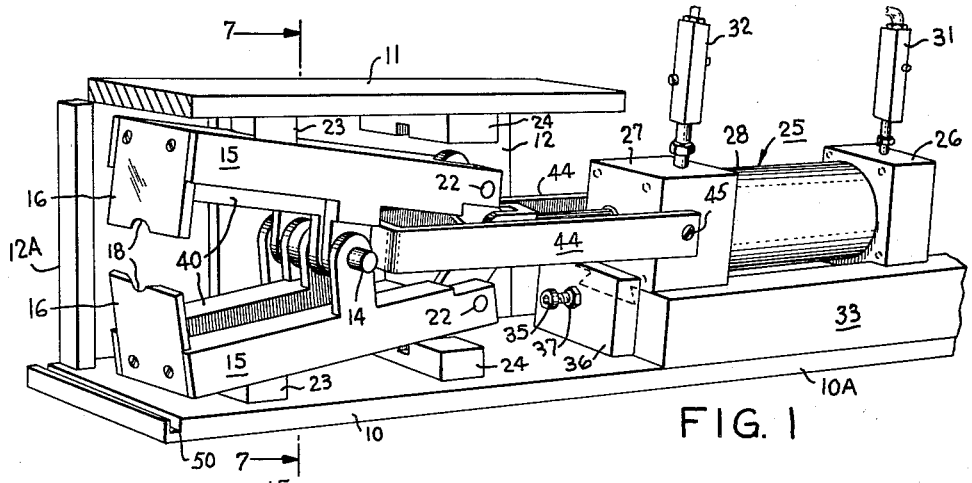
FIGURE 1 is a perspective view of a wire stripping machine constructed in accordance with the invention, the side wall of the machine closest to the viewer being removed to show the interior parts.

In the drawings, the invention is shown as incorporated in a wire stripping machine which, referring to FIGURE 1, includes supporting structure comprising a main supporting plate 10, and an opposed spaced parallel secondary supporting plate 11. The plates 10 and 11 are interconnected by a second pair of plates 12 (only one shown in FIGURE 1), to provide a generally open-ended box-like enclosure having a portion of one wall thereof, i.e., portion 10A of wall 10 extended.

Figure 2:
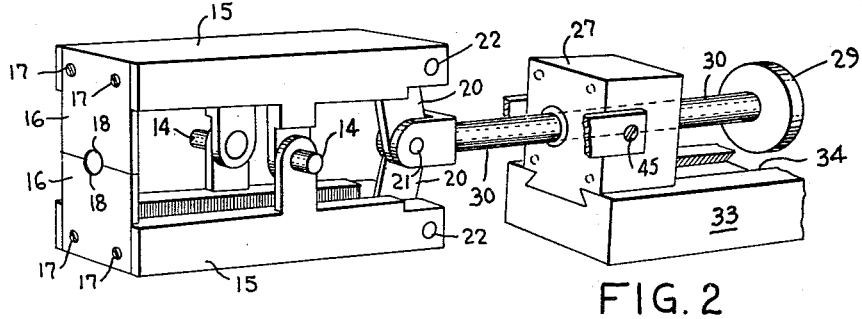
FIGURE 2 is a perspective view of a portion of the wire stripping machine of FIGURE 1, showing particularly the insulation cutting jaws and their actuating means.
Figure 7:
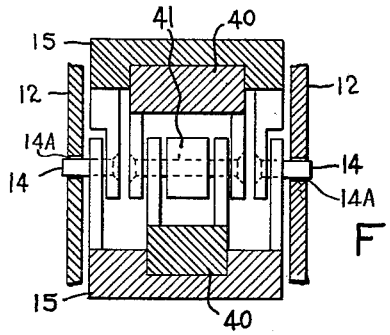
FIGURE 7 is a sectional view substantially as on the line 7—7 of FIGURE 1, but with the jaws in closed position.

The side plates 12 are each provided with a hole 14A (see FIG. 7) which holes serve as bearings for a pair of pins 14, see particularly FIGURE 2. The pins 14 serve to pivotally interconnect and support a pair of insulation cutting jaw members 15. The jaw members 15 carry insulation cutting plates 16 at one end, which are removably mounted by suitable means, such as by screws 17. The cutting blades 16 each include a generally semi-circular notch 18 which is ground to a sharp edge.

The cutting jaws 15 are also interconnected by a pair of toggle links 20 interconnected by a knee pin 21, each of the links 20 being connected at its outer end to a respective one of the cutting jaw members 15 by pins 22 respectively.

A pair of stop blocks 23 are provided, carried by the plates 10 and 11 respectively, to limit the travel of the cutting jaw members 15 in the opening direction. A second pair of stop blocks 24 are also provided, likewise carried by the plates 10 and 11 respectively, to limit the travel of the cutting jaw members in the closing direction.

For the purpose of operating the cutting jaw members 15, in a manner to be described, linearly-acting actuating means is provided comprising a pneumatic-cylinder type actuator 25 including a pair of end blocks 26 and 27 respectively, a cylinder portion 28, and a plunger member 29 (see FIGURE 2), having an actuating rod 30. The blocks 26 and 27 are provided with air hose connecting means 31 and 32 respectively.

The entire pneumatic actuator 25 is slidably supported on a supporting block 33 by having portions of the blocks 26 and 27 arranged to ride in a dove-tail shaped slot 34 in the block 33.

Linear motion of the rod 30 of the actuating means 25 causes collapsing and straightening motion of the toggle links 20, with corresponding rocking movement of the cutting jaws 15 about the pins 14 between open and closed positions as indicated in FIGURES 1 and 2 respectively. It should be noted at this point that the axis of rotation of the jaw members 15, that is, the axis of pins 14, is *stationary* since these pins ride in fixed bearings carried by the side plates 12.

For the purpose of limiting the sliding movement of the pneumatic actuator 25 in a direction toward the cutting jaw members 15, adjustable stop means is provided comprising a bolt 35 threadedly carried by a block 36 rigidly affixed to the main supporting plate 10, a lock nut 37 also being provided to lock the bolt 35 in pre-set position.

Figure 3:
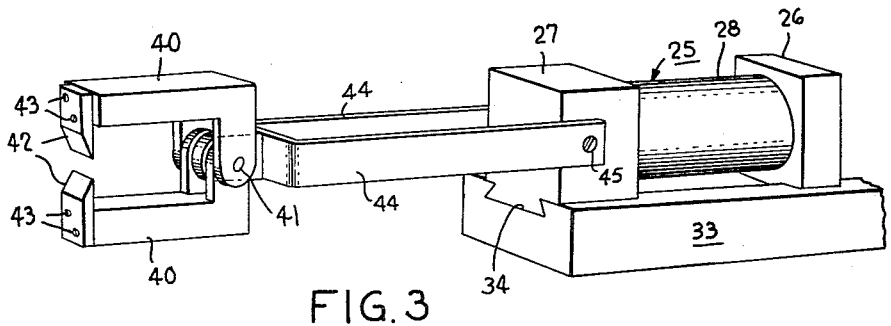
FIGURE 3 is a perspective view of a portion of the wire stripping machine of FIG. 1, showing particularly the wire stripping jaws and their actuating means.

The cutting jaw members 15 are generally channel-shaped in cross-section, (see FIGURE 7) and a pair of wire stripping jaws 40 are slidably supported within the cutting jaw members 15 respectively. Referring to FIGURE 3, the wire stripping jaws 40 are generally L-shaped and are pivotally interconnected by a pivot pin 41, and carry a pair of insulation-gripping members 42 removably mounted thereon by suitable means such for example as screws 43. The pivot pin 41 is connected by means of a pair of arms 44 to the end block 27 of the actuator 25, by suitable means such as by screws 45.

Figure 9:
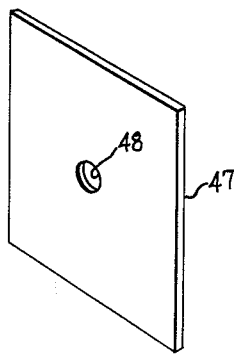
FIGURE 9 is a perspective view of a guide plate which comprises a part of the machine of FIGURE 1 but which is shown separately for clarity.

A front guide plate 47, see FIGURE 9, is also provided, having an entry opening 48 of predetermined diameter to admit and to help guide the conductor to be stripped. The plate 47 is mounted at one end of the assembly, by suitable means, such for example as by sliding into corresponding grooves 50 in the supporting plates 10 and 11 respectively.

*Operation*

Figure 4:
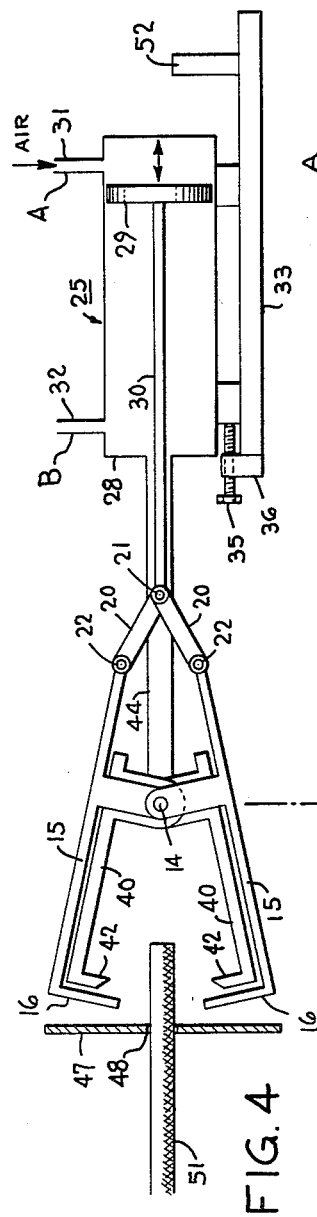
FIGURES 4, 5 and 6 are semi-diagrammatic representations showing the machine of FIGURE 1 in different phases of a cycle of operation.
Figure 5:
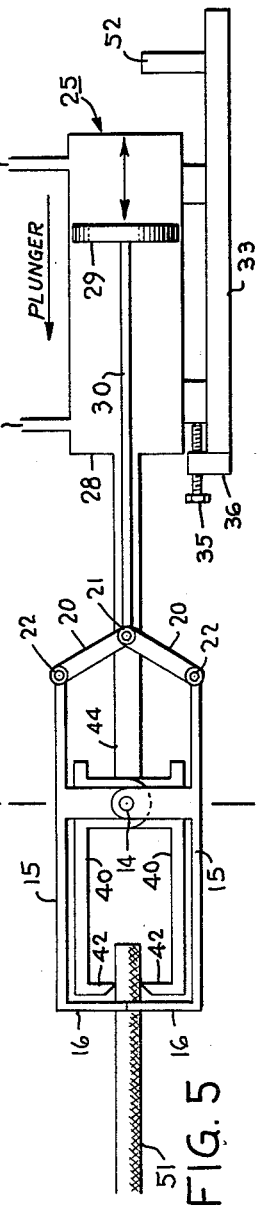
Figure 6:
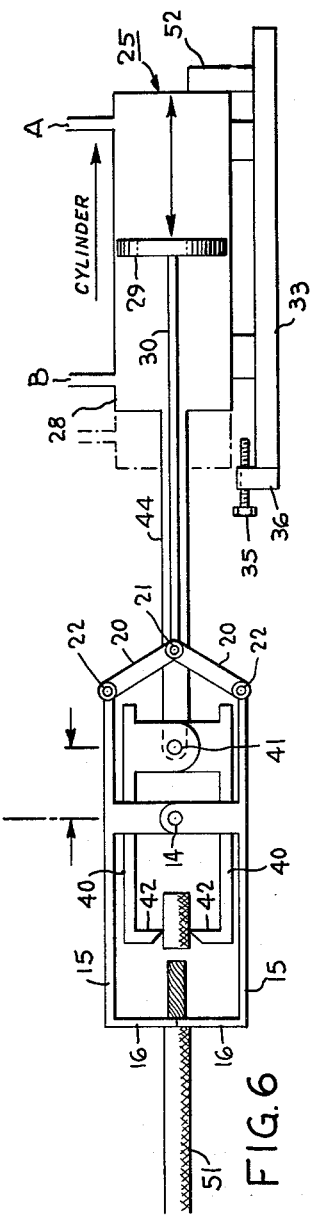

The operation of the machine can best be understood by reference to FIGURES 4, 5 and 6. These figures have been arranged in aligned relation, with the pivot pin 14 in each figure in vertical alignment with the pin 14 in the adjacent figure, for ease in comparing the positions of the parts.

Assuming the parts to be in the condition shown in FIGURE 4, with the cutting jaw members in full open condition, and the plunger 29 to the extreme of its right limit of travel as viewed, and the cylinder 28 in engagement with the stop bolt 35, a section of conductor 51 to be stripped is inserted through the opening 48 of the guide plate 47 a predetermined amount. An air valve, not shown, is then opened, admitting air under pressure to the inlet A of cylinder 28, at the right hand side, as viewed, of the plunger 29. Since the air pressure acts equally in all directions, it tends to move the cylinder 28 to the right as viewed and to move the plunger 29 to the left as viewed. It will be recalled, however, that the cylinder 28 is connected by means of the arms 44 to the knee pin 41 of the stripping jaws 40, see FIGURE 3. Thus the cylinder 28 cannot move to the right unless the jaws 40 are also free to move to the right. At this time, however, the jaws 40 cannot move to the right, since they are within channels in the cutting jaws 15 which at this time are in a position in which they converge in the right hand direction, thereby making any sliding movement of the stripping jaws 40 in that direction impossible. Movement of the gripping jaws 40 in the converging direction of the cutting jaws 15 is not possible at this time since, because of the convergence of the guiding portions of the jaws 15, such movement would require the jaws 14 to move relative to each other, i.e., closer together. This, however, is not possible due to their interconnection by pivot pin 41. It will also be recalled at this point that the cutting jaws 15 are supported on the stationary pivot pins 14.

Since the cylinder 28 cannot move to the right at this time, that is, under the conditions shown in FIGURE 4, the result of air pressure admitted to the right hand side of the piston 29 is only to force the plunger 29 to the left as viewed, straightening the toggle links 20 to the full closed position as shown in FIGURE 5. This brings the cutting jaws to closed position, cutting through the insulation of the conductor.

Figure 8:
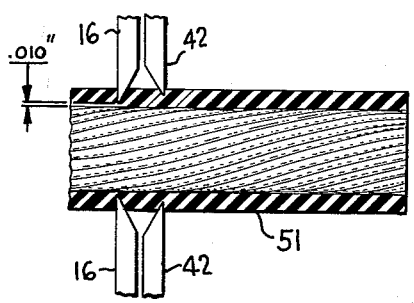
FIGURE 8 is a view on enlarged scale, showing an end section of a conductor and the positions of portions of the cutting and stripping jaws respectively at the time when the jaws have just completely closed.

When the parts reach the position of FIGURE 5, the cutting blades 16 will have cut through the insulation of the conductor 51 to the desired depth, and the jaw members 15 will have come into engagement with the stop blocks 24. At the same time, the insulation gripping means 42 of the stripping jaws 40 will have also cut in a small amount into the insulation of the conductor. The relative positions of the cutting and stripping jaws at this particular time are shown on enlarged scale in FIGURE 8. It will be observed that the cutting blades 16 are not permitted to close far enough to touch the metallic conductor. In other words, the cutting blades 16 do not cut completely through the insulation sheath of the conductor. In practice, it has been found that a clearance of about .010 of an inch produces satisfactory results. The object, of course, is to avoid scratching or marking or nicking the metallic portion of the conductor in any way, while at the same time virtually completely cutting the insulation. At the same time, the gripping members 42 of the stripping jaws 40 enter and cut part way into the insulation of the conductor just ahead of the cutting blades 16.

When the parts have reached the condition shown in FIGURE 5, it will be apparent that the plunger 29 cannot move any further to the left since straightening of the toggle is limited by engagement of the cutting jaws with the stop blocks 24. At the same time it will be observed that the cutting jaws 15 have now assumed a position in which they are completely parallel to each other, thus affording a sliding guideway, along which the stripping jaws 40 can move to the right. Since the jaws 40 are free to move, the cylinder 28 at this time moves to the right as viewed. The travel of the cylinder in this direction is limited by engagement with a stop block 52 carried by the base plate 33.

As the cylinder travels to the right the section of the insulating sheath of the conductor 51 which has been cut substantially through by the cutting blades 16, is pulled off the end of the conductor.

As previously mentioned, most conductors of substantial size are composed of a number of individual strands which are twisted in spiral fashion. The insulating sheath, which often is molded onto the wire in a plastic state, fits the outer convolutions of the conductor very closely, so that in effect, a screw-thread type relationship exists between the insulating sheath and the conductor. In order to facilitate removal of such a section of insulation, I provide an insulation gripping means comprising a straight-line knife-edge type pair of jaws which cut only part way into the insulation. With this type of gripping means, as the insulation section is pulled away from the wire, it is permitted to rotate, so as to, in effect, unscrew from the spiral conductor.

When the insulation cutting and removing operation has been completed to the extent shown in FIGURE 6, the air pressure is removed from the right hand side of the plunger 29, and is applied to inlet B which permits pressure to be created on the left-hand side of the plunger. This causes the sequence of operations to be reversed. It will be observed that when air pressure is applied to the left hand side of the plunger 29, under the conditions shown in FIGURE 6, the plunger 29 cannot move further to the right since the jaws 15 cannot rotate while the stripper jaws 40 are out of the position in which the pin 41 is concentric with the pin 14. The initial effect of air pressure on this side of the plunger 29, therefore, is to move the cylinder 28 to the left as viewed, returning the stripper jaws to the position in which the pin 41 is concentric with the pin 14. It will be noted that the conductor 51 will normally have been removed by this time, since there is no longer anything holding it. When the stripper jaws have reached the position where the pin 41 is concentric with the pin 14, i.e., the same position as shown in FIGURE 5, the cylinder 28 will have engaged the stop 35. Further air pressure on the left hand side of the plunger 29 then causes the plunger 29 to move to the right as viewed collapsing the toggle links 20, and opening the jaws 15 as well as the jaws 40, causing the jaws 40 to drop the insulation section, and returning the parts to the condition shown in FIGURE 4.

While the wire stripping machine disclosed as illustrated in the drawings as oriented so that the main supporting plate 10 is in a horizontal plane, the machine in use is preferably rotated 90° from this position, so that the plates 10 and 11 are in vertical planes, and with the plate 12 in a horizontal plane below the cutting jaws 15. The plate 12 also terminates short of the cutting plates 16, that is, just beyond the bearing for the pin 14, leaving an opening between itself and the corner post 12A.

When the parts move to open position, therefore, following each cutting and stripping operation, the sections of insulation which have been removed are released by the jaws 40 and fall through the aforesaid opening and may be collected in a suitable receptacle or otherwise disposed of.

Stop Gauge

Figure 10:
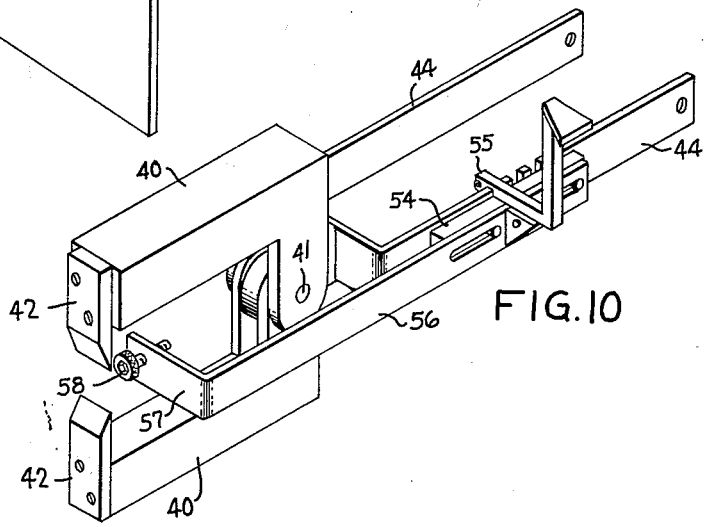
FIGURE 10 is a perspective view of the wire stripping jaw assembly of the machine of FIGURE 1, shown as including an adjustable stripping length gauge.

In FIGURE 10 there is illustrated a modified form of the invention including and adjustable stop gauge comprising a supporting block 54 which is slidably supported on one of the arms 44, being provided with position retaining means, such as a lever or catch or detent 55 which is spring biased into engagement with a series of teeth or notches in the upper edge of the arm 44. The block 54 carries an arm 56 which includes a bent-over portion 57 at its remote end, carrying an adjustable stop bolt 58. The lever 55 is preferably made readily accessible for operation from outside the machine, so that the stop member can be moved in predetermined steps. The stop bolt 58 is provided in order to achieve fine adjustment.

Figure 11:
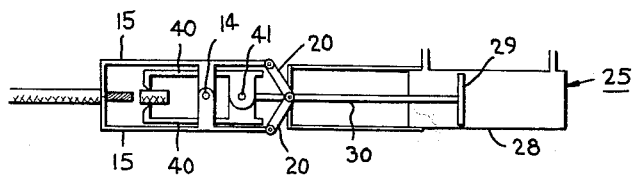
FIGURE 11 is a semi-diagrammatic view, similar to FIGURE 6, but showing another embodiment of the invention.

In FIGURE 11 I have shown, in semi-diagrammatic form, another embodiment of the invention. The invention in this form is shown in the same condition as illustrated in connection with the previous embodiment in FIGURE 6. In this form, however, the stripping jaws 40 are connected to the plunger 29 of the cylinder 25, and the cutting jaw members 15 are connected to the cylinder portion 28. Operation of this form of the invention is essentially identical to that of the form described previously, except that pressure is applied to the opposite side of the plunger 29 in order to achieve a particular desired operation. Thus for example with the parts in the condition shown in FIGURE 11, air pressure admitted to the right hand side of the plunger 29 will tend to cause the cylinder 28 to move to the right. Motion of the cylinder to the right at this time is not possible, however, because of the position of the stripping jaws 40, preventing pivotal movement of the cutting jaw members 15. Therefore the plunger member 29 will move to the left, moving the stripping jaw assembly 40 to the left as viewed until the pivot point 41 becomes concentric with the pivot pins 14, the rod member 30 being provided with suitable stop means, not shown, to prevent further travel. Continued air pressure at the right hand side of the plunger 29 will thereafter cause the cylinder 28 to move to the right as viewed, collapsing the toggle links 20 and moving the assembly to the initial open position.

While the invention has been described in only two embodiments, it will be readily apparent that many modifications thereof may readily be made, and I therefore intend by the appended claims to cover all such modifications as fall within the true spirit and scope of the invention.

What I claim as new and desire to secure by Letters Patent of the United States is:

1. A wire stripping machine for removing a section of insulation sheath from an elongated electrical conductor comprising:
   (a) a pair of pivotally supported cutting jaw members, each of said cutting jaw members comprising an elongated planar guide surface and an insulation cutting edge;
   (b) a pair of pivotally supported interconnected insulation gripping jaw members, each of said gripping jaw members being supported for sliding movement along said planar guide surface of a corresponding one of said cutting jaw members respectively;
   (c) said cutting jaw members being movable between an open position in which said planar guide surfaces converge in a first direction and a closed position in which said planar guide surfaces extend parallel to each other;
   (d) actuating means for moving said cutting jaw members between said open and closed positions, and
   (e) actuating means for sliding said insulation gripping jaws along said planar guide surfaces in said first direction when said cutting jaws are in said closed position, to remove said section of insulation following cutting of said insulation by said cutting jaw members,
   (f) said gripping jaw members being prevented from moving in said first direction by said planar guide surfaces of said gripping jaw members at all times except when said cutting jaw members are in said closed position.

2. A wire stripping machine for removing a section of insulation sheath from an elongated electrical conductor comprising:
   (a) a pair of pivotally supported cutting jaw members, each of said cutting jaw members comprising an elongated planar guide surface and an insulation cutting edge;
   (b) a pair of insulation gripping jaw members, said insulation gripping jaw members being pivotally interconnected, and being supported within said cutting jaw members with each of said gripping jaw members in slidably guided engagement with a corresponding one of said guide surfaces of said cutting jaw members respectively;
   (c) said cutting jaw members being movable between an open position in which said planar guide surfaces converge in a first direction and a closed position in which said planar guide surfaces extend parallel to each other;
   (d) actuating means for moving said cutting jaw members between said open and closed positions, and
   (e) actuating means for sliding said insulation gripping jaws along said planar guide surfaces in said first direction when said cutting jaws are in said closed position, to remove said section of insulation following cutting of said insulation by said cutting jaws,
   (f) said gripping jaw members being prevented from moving in said first direction by said planar guide surfaces of said gripping jaw members at all times except when said cutting jaw members are in said closed position.

3. A wire stripping machine for removing a section of insulation sheath from an elongated electrical conductor comprising:
   (a) a pair of cutting jaw members each of said cutting jaw members comprising an elongated planar guide surface and an insulation cutting portion, said cutting jaws being supported for rotation about a common fixed axis;

(b) a pair of insulation gripping jaw members, said gripping jaw members being pivotally interconnected, and each of said gripping jaw members being supported for sliding movement along a planar guide surface of a corresponding one of said cutting jaw members respectively;

(c) said cutting jaw members being movable between an open position in which said planar guide surfaces converge in a first direction and a closed position in which said planar guide surfaces extend parallel to each other;

(d) said gripping jaw members being slidable along said guide surfaces between a first position and a second position to remove said section of insulation from said conductor following cutting of said insulation by said cutting jaws, when said cutting jaws are in said closed position;

(e) said pivotal connection of said gripping jaw members being co-axial with said common axis of rotation of said cutting jaw members when said gripping jaw members are in said first position;

(f) means for actuating said cutting and gripping jaws, and (g) said gripping jaw members being prevented from moving in said first direction by said planar guide surfaces of said gripping jaw members at all times except when said cutting jaw members are in said closed position.

4. A wire stripping machine for removing a section of insulation sheath from an elongated electrical conductor comprising:

(a) a pair of pivotally supported cutting jaw members, each of said cutting jaw members comprising an elongated planar guide surface and an insulation cutting portion, said cutting jaws being supported for rotation about a common fixed axis;

(b) a pair of insulation gripping jaw members said gripping jaw members being pivotally interconnected, and each of said gripping jaw members being supported for sliding movement along a planar guide surface of a corresponding one of said cutting jaw members respectively;

(c) said cutting jaw members being movable between an open position in which said planar guide surfaces converge in a first direction and a closed position in which said planar guide surfaces extend parallel to each other;

(d) said gripping jaw members being slidable along said guide surfaces between a first position and a second position to remove said section of insulation from said conductor following cutting of said insulation by said cutting jaws when said cutting jaws are in said closed position;

(e) said pivotal connection of said gripping jaw members being co-axial with said common axis of rotation of said cutting jaw members when said gripping jaw members are in said first position, and (f) actuating means for moving said cutting jaw members between said open and closed positions comprising a pair of toggle links having a knee pin, said knee pin being movable in said first direction to collapse said toggles and to move said cutting jaw members to said open position.

5. A wire stripping machine as set forth in claim 4, said machine also comprising a single force-producing means acting on said gripping jaw members to move said gripping jaw members in said first direction and simultaneously acting on said knee pin of said toggle to move said knee pin in a direction opposite to said first direction.

6. A wire stripping machine as set forth in claim 4, said machine also comprising a fluid operated cylinder and a plunger supported therein, means slidably supporting said cylinder, and means connecting said cylinder selectively to one of said knee pin and gripping jaw members and said plunger to the other of said knee pin and gripping jaw members whereby to exert a force in a given direction upon said knee pin and simultaneously in the opposite direction upon said gripping jaw members.

7. A wire stripping machine comprising:

(a) a pair of pivotally interconnected cutting jaw members;

(b) a pair of pivotally interconnected gripping jaw members;

(c) said gripping jaw members being supported each on a corresponding one of said cutting jaw members and being movable therealong between a first position in which the pivotal connection of said gripping jaw members is co-axial with the pivotal connection of said cutting jaw members and a second position in which said pivot of said gripping jaw members is laterally displaced from said pivot of said cutting jaw members;

(d) said cutting jaw members extending in parallel relation when in closed position to permit sliding movement of said gripping jaw members therealong;

(e) said gripping jaw members being movable between open and closed positions by said cutting jaw members when said pivotal connections are in said co-axial relation;

(f) means for operating said cutting jaw members between open and closed positions comprising a pair of toggle links having a knee pin;

(g) actuating means comprising a fluid operated cylinder having a movable plunger therein;

(h) means slidably supporting said cylinder;

(i) means connecting said cylinder to said gripping jaws, and (j) means connecting said plunger to said knee pin of said toggle linkage.

8. A wire stripping machine comprising:

(a) a pair of pivotally interconnected cutting jaw members;

(b) a pair of pivotally interconnected gripping jaw members;

(c) said gripping jaw members being supported each on a corresponding one of said cutting jaw members and being movable therealong between a first position in which the pivotal connection of said gripping jaw members is co-axial with the pivotal connection of said cutting jaw members and a second position in which said pivot of said gripping jaw members is laterally displaced from said pivot of said cutting jaw members;

(d) said cutting jaw members extending in parallel relation when said jaws are in closed position to permit sliding movement of said gripping jaw members therealong;

(e) said gripping jaw members being movable between open and closed positions by said cutting jaw members when said pivotal connections are in said co-axial relation;

(f) means for operating said cutting jaw members between open and closed positions comprising a pair of toggle links having a knee pin;

(g) actuating means comprising a fluid operated cylinder having a movable plunger therein;

(h) means slidably supporting said cylinder;

(i) means connecting said cylinder to said knee pin of said toggle linkage, and (j) means connecting said plunger to said gripping jaws.

9. A wire stripping machine for removing a section of insulation sheath from an elongated electrical conductor comprising:

(a) a pair of pivotally supported cutting jaw members, each of said cutting jaw members comprising an elongated planar guide surface and an insulation cutting edge;

(b) a pair of pivotally interconnected insulation gripping jaw members, each of said gripping jaw members being supported for sliding movement along said planar guide surface of a corresponding one of said cutting jaw members respectively;

(c) said cutting jaw members being movable between an open position in which said planar guide surfaces converge in a first direction and a closed position in which said planar guide surfaces extend parallel to each other;

(d) actuating means for moving said cutting jaw members between said open and closed positions;

(e) actuating means for sliding said insulation gripping jaws along said planar guide surfaces in said first direction when said cutting jaws are in said closed position, to remove said section of insulation following cutting of said insulation by said cutting jaw members, and (f) said gripping jaw members comprising a pair of straight knife-edge cutting members extending in a direction substantially at right angles to the direction of said conductor, (g) said gripping jaw members being prevented from moving in said first direction by said planar guide surfaces of said gripping jaw members at all times except when said cutting jaw members are in said closed position.

References Cited by the Examiner
UNITED STATES PATENTS

| | | |
|---|---|---|
| 2,765,685 | 10/56 | Stratman et al. _____ 81—9.51 |
| 2,996,939 | 8/61 | Meier |
| 3,087,363 | 4/63 | Jacobs. |
| 3,108,505 | 10/63 | Bartley. |

FOREIGN PATENTS

| | | |
|---|---|---|
| 780,257 | 1/35 | France. |
| 890,075 | 9/53 | Germany. |
| 662,507 | 12/51 | Great Britain. |

References Cited by the Applicant
FOREIGN PATENTS

| | | |
|---|---|---|
| 187,161 | 10/56 | Austria. |

WILLIAM FELDMAN, *Primary Examiner.*